(12) United States Patent
Salewski et al.

(10) Patent No.: US 12,011,991 B2
(45) Date of Patent: Jun. 18, 2024

(54) CLOSURE ARRANGEMENT FOR CLOSING A FUEL INLET COMPARTMENT OF A BODY OF A MOTOR VEHICLE

(71) Applicant: BOS GMBH & CO. KG, Ostfildern (DE)

(72) Inventors: Jürgen Salewski, Wendlingen (DE); William Pompili, Shelby Township, MI (US)

(73) Assignee: BOS GMBH & CO. KG, Ostfildern (DE)

( * ) Notice: Subject to any disclaimer, the term of this patent is extended or adjusted under 35 U.S.C. 154(b) by 318 days.

(21) Appl. No.: 17/354,574

(22) Filed: Jun. 22, 2021

(65) Prior Publication Data
US 2021/0396061 A1 Dec. 23, 2021

Related U.S. Application Data

(60) Provisional application No. 63/042,745, filed on Jun. 23, 2020.

(51) Int. Cl.
*B60K 15/05* (2006.01)

(52) U.S. Cl.
CPC ...... *B60K 15/05* (2013.01); *B60K 2015/0523* (2013.01); *E05Y 2201/628* (2013.01);
(Continued)

(58) Field of Classification Search
CPC B60K 15/04; B60K 15/05; B60K 2015/0507; B60K 2015/0515;
(Continued)

(56) References Cited

U.S. PATENT DOCUMENTS

| | | | | |
|---|---|---|---|---|
| 8,089,228 B2 * | 1/2012 | Ballard | ............ | B60K 15/05 73/1.03 |
| 2015/0231968 A1 * | 8/2015 | Dunger | ............ | B60K 15/05 220/211 |
| 2017/0356228 A1 * | 12/2017 | Herczeg | ............ | B60K 15/05 |

(Continued)

FOREIGN PATENT DOCUMENTS

| | | | | | |
|---|---|---|---|---|---|
| CN | 110239633 A | * | 9/2019 | ............ | B60L 53/16 |
| DE | 102014016911 B4 | | 5/2016 | | |

(Continued)

OTHER PUBLICATIONS

Bauernfeind, "Closure Device for a Filling Opening or a Connection Element on a vehicle comprising an emergency unlocking mechanism", Published: Mar. 8, 2017, Publisher: German Patent Office, Edition: WO2017129412 (Year: 2017).*

(Continued)

*Primary Examiner* — Joseph D. Pape
(74) *Attorney, Agent, or Firm* — FLYNN THIEL, P.C.

(57) ABSTRACT

A closure arrangement for closing a fuel inlet compartment of a motor vehicle body, including a guide device fixed to the vehicle, a cover element displaceably guided on the guide device between a closed position in which the fuel inlet compartment is closed and an open position in which the fuel inlet compartment is open. The guided displacement of the cover element between the closed and open positions includes reciprocating movement and longitudinal movements. The closure arrangement has a drive device operatively connected to the cover element and drives same between the closed and open positions. The drive device has a drive rod element acting axially indirectly on the cover element so as to transmit pulling and pushing forces. The cover element is displaceable between the closed and the (Continued)

open positions by an axial drive movement of the drive rod element with reciprocating and longitudinal movement.

17 Claims, 7 Drawing Sheets

(52) U.S. Cl.
CPC .................. *E05Y 2201/686* (2013.01); *E05Y 2201/716* (2013.01); *E05Y 2201/722* (2013.01); *E05Y 2600/51* (2013.01); *E05Y 2900/534* (2013.01)

(58) Field of Classification Search
CPC .... B60K 2015/0523; B60K 2015/0538; E05Y 2201/71; E05Y 2201/622; E05Y 2201/628; E05Y 2201/686; E05Y 2201/688; E05Y 2201/704; E05Y 2201/716; E05Y 2201/722; E05Y 2600/51; E05Y 2900/534; E05F 15/00; E05F 15/60; E05F 15/67; E05F 15/603; E05F 15/611; E05F 15/616; E05F 15/619; E05F 15/632; E05F 15/635; E05D 15/165; E05D 15/20; B62D 25/24; Y02T 90/14

USPC .................. 296/97.22; 320/109; 49/386, 501
See application file for complete search history.

(56) References Cited

U.S. PATENT DOCUMENTS

2019/0193536 A1* 6/2019 Pompili .................. B60J 7/141
2021/0246701 A1* 8/2021 Shin ...................... E05D 15/165

FOREIGN PATENT DOCUMENTS

| DE | 102015206715 | A1 | 10/2016 | | |
|---|---|---|---|---|---|
| DE | 102016110869 | A1 | 12/2017 | | |
| WO | WO-2017129412 | A1 * | 8/2017 | | |
| WO | WO-2018219268 | A1 * | 12/2018 | ............. | B60K 15/05 |

OTHER PUBLICATIONS

Chaun et al., "Charging interface component and vehicle", Published: Sep. 17, 2019, Published: Chinese Patent Office, Edition: CN110239633A (Year: 2019).*

German Office Action issued in corresponding German Application No. 10 2020 209 607.4 date of mailing Feb. 9, 2021 (8 pages).

* cited by examiner

CLOSURE ARRANGEMENT FOR CLOSING A FUEL INLET COMPARTMENT OF A BODY OF A MOTOR VEHICLE

CROSS-REFERENCE TO RELATED APPLICATION

This claims priority to U.S. Provisional Application No. 63/042,745, filed Jun. 23, 2020, the disclosure of which is hereby incorporated by reference in its entirety.

TECHNICAL FIELD

The invention relates to a closure arrangement for closing a fuel inlet compartment of a body of a motor vehicle, including a guide device which, in a ready-for-use mounted state, is fixed to the vehicle, and a cover element which is displaceably guided on the guide device between a closed position in which the cover element closes the fuel inlet compartment and an open position in which the cover element opens up the fuel inlet compartment. The guided displacement of the cover element between the closed position and the open position includes a reciprocating movement in a reciprocating direction and a longitudinal movement in a longitudinal direction. A drive device operatively connected to the cover element is also provided, the cover element being displaceable thereby so as to be driven between the closed position and the open position.

BACKGROUND AND SUMMARY

Such a closure arrangement is disclosed in the form of a tank flap arrangement in DE 10 2014 016 911 B4 and is provided for closing a fuel inlet compartment of a body of a motor vehicle. The disclosed tank flap arrangement has a cover element in the form of a tank flap which is displaceable between a closed and an open position on a guide device which is fixed to the vehicle. In this case, starting from the closed position, the tank flap initially performs a reciprocating movement in a reciprocating direction and then a longitudinal movement in a longitudinal direction. For the displacement of the tank flap with reciprocating movement the disclosed closure arrangement has an articulated lever mechanism. The articulated lever mechanism acts on the tank flap and is guided together therewith on the guide device in a longitudinally movable manner. For the longitudinal movement of the cover element and the articulated lever mechanism, the disclosed closure arrangement has a cable pull mechanism.

It is one aspect of the invention to provide a closure arrangement of the type mentioned in the introduction which has a design which is simple and at the same time robust.

This is achieved by the drive device having a drive rod element which acts in the axial direction thereof at least indirectly on the cover element so as to transmit a pulling and pushing force, wherein the cover element is displaceable between the closed position and the open position by means of an axial drive movement of the drive rod element with reciprocating and longitudinal movement. By means of this solution, in particular, relatively complex mechanisms for the separate reciprocating movement and longitudinal movement of the cover element may be dispensed with. Rather, the drive rod element is provided and operatively connected in the axial direction thereof to the cover element so as to transmit a pulling and pushing force. By means of the axial drive movement of the drive rod element, the cover element is displaceable so as to be driven between the closed position and the open position with both reciprocating and longitudinal movement. This solution thus permits a relatively simple design and thereby a cost-effective production associated therewith. At the same time, a robust design is achieved by means of the solution. The drive rod element is preferably a toothed rod element or a threaded spindle element. For the axial drive movement of the drive rod element, depending on the embodiment of the drive rod element, the drive device preferably has a drive gear meshed with the drive rod element or a threaded drive nut connected to the drive rod element with threading movement. The guide device serves for a reciprocating and longitudinal guidance of the cover element, in particular with sliding and/or rolling movement. The reciprocating direction and the longitudinal direction of the displacement movement are oriented transversely relative to one another, preferably perpendicularly. Preferably, the reciprocating movement takes place parallel to the reciprocating direction. Preferably, the longitudinal movement takes place parallel to the longitudinal direction. In the ready-for-use state mounted on the motor vehicle, the reciprocating movement preferably takes place in the direction of an outer face of the body, so that in the open position the cover element is arranged on the outer face. Alternatively, the reciprocating movement may take place in the direction of an inner face of the body so that in the open position the cover element is arranged on the inner face. In the ready-for-use mounted state the longitudinal movement preferably takes place along a vertical axis of the motor vehicle. Alternatively, the longitudinal movement may take place along a longitudinal axis of the motor vehicle. The cover element is preferably displaceable with linear movement on the guide device. The guide device is preferably designed as a sliding guide and has guide tracks and guide elements, wherein the guide elements cooperate with the guide tracks with sliding and/or rolling movement. Preferably, the guide tracks are fixed to the vehicle and the guide elements are movable relative thereto, together with the cover element. Alternatively, the guide elements may be fixed to the vehicle and the guide tracks may be movable relative thereto, together with the cover element. The driven displacement of the cover element takes place by means of a pulling force and/or pushing force of the drive rod element. Depending on the direction of the displacement movement of the cover element, the drive rod element functions either as a pull rod or as a push rod. Preferably, with a displacement oriented into the open position the drive rod element functions as a pull rod, and with a displacement movement oriented opposingly into the closed position as a push rod.

The drive rod element is longitudinally extended in the axial direction thereof. Preferably the axial direction (in a first viewing plane) is oriented in, in particular parallel to, the longitudinal direction of the longitudinal movement and (in a second viewing plane oriented perpendicularly to the first viewing plane) in, in particular parallel to, the longitudinal direction and at an angle, in particular perpendicularly, to the reciprocating direction of the reciprocating movement. An angular orientation of the axial direction relative to the longitudinal direction and/or reciprocating direction may vary at least slightly during the displacement movement of the cover element. In particular, depending on the extent of the reciprocating movement relative to the longitudinal movement, an angular compensation may be required for compensating for such a variable angular orientation. To this end, the drive rod element may act on the cover element with an articulated movement and/or a flexurally resilient design of the drive rod element may be provided. The cover element may also be denoted, in particular, as a cover, flap, slider or closure. The fuel inlet compartment is to be understood as that region of the body in which a tank filler neck for filling a fuel tank of the motor vehicle is arranged or in which a charging socket for electrically charging a traction battery of the motor vehicle is arranged. In this regard, the fuel inlet compartment may also be denoted as the charging compartment or charging socket compartment.

In an embodiment of the invention, the drive rod element is operatively connected to the cover element, in a pivotably movable manner relative to the cover element, by means of an articulated arrangement about a pivot axis oriented perpendicularly to the axial direction. The articulated arrangement permits an angular compensation between the axial drive direction of the drive rod element and the variable displacement direction—depending on the displacement position—of the cover element. To this end, the pivot axis of the articulated arrangement is oriented perpendicularly to the axial direction of the drive rod element. In other words, the pivot axis is oriented perpendicularly to a guide plane of the cover element spanned between the reciprocating direction and the longitudinal direction.

In a further embodiment of the invention, the cover element is mounted on the guide device by means of a bearing device which cooperates with the guide device with sliding and/or rolling movement, wherein the cover element is connected to the bearing device in an immovable manner relative to the bearing device and wherein the drive rod element acts on the bearing device. The bearing device serves firstly for supporting the cover element on the guide device with guiding movement. To this end, the cover element is connected to the bearing device and is immovable relative thereto. In other words, the cover element and the bearing device are guided together on the guide device with reciprocating and longitudinal movement, wherein the bearing device (rather than the cover element) cooperates with the guide device. Additionally, the bearing device functions as a force-transmitting structure between the drive rod element and the cover element. In other words, the pulling and pushing forces which are generated for the displacement of the cover element by means of the drive rod element are introduced into the bearing device. The cover element is preferably arranged on an upper face of the bearing device. Preferably, the drive rod element acts on the bearing device on a lower face of the bearing device opposing the upper face. If an angular compensation should be required between the axial drive movement and the differently oriented displacement direction of the cover element—depending on the displacement position—the drive rod element preferably acts with an articulated movement on the bearing device. Alternatively, the drive rod element may be engaged rigidly on the bearing device and may be designed to be flexurally resilient for the angular compensation.

In a further embodiment of the invention, the articulated arrangement has a first articulated portion which is arranged on the bearing device and a second articulated portion which is arranged at the front end side on the drive rod element, said articulated portions cooperating with pivoting movement about the pivot axis. Preferably, the first articulated portion and the second articulated portion form a hinged joint. This embodiment of the invention is structurally simple and yet robust. The second articulated portion is arranged and/or configured on a front end region of the drive rod element facing the bearing device. The first articulated portion is preferably arranged and/or configured on a front end region of the bearing device facing the drive rod element.

In a further embodiment of the invention, the bearing device has a plurality of guide elements which are extended parallel to the pivot axis and/or perpendicularly to the axial direction of the drive rod element and which are supported on one respective guide track of the guide device with sliding movement. Said orientation between the guide elements and the pivot axis and/or the axial direction provides advantages, in particular, regarding a smooth, and at the same time tilt-proof, displacement of the cover element. The guide elements are preferably designed in each case as sliding elements. The guide tracks are preferably designed in each case as a sliding track in the form of a sliding web or sliding slot. For the guidance of the guide elements and thus of the cover element connected to the bearing device with reciprocating and longitudinal movement, the guide tracks in each case have a reciprocating track portion which is longitudinally extended in the reciprocating direction and a longitudinal track portion which is longitudinally extended in the longitudinal direction.

In a further embodiment of the invention, the bearing device is designed in the form of a bearing frame which has at least two longitudinal frame elements which are longitudinally extended in the axial direction of the drive rod element and which are connected together by means of at least one transverse frame element which is longitudinally extended transversely to the axial direction. This embodiment of the invention permits a structurally simple and robust design of the bearing device. Preferably the longitudinal frame elements extend parallel to the axial direction. In the transverse direction, the longitudinal frame elements are arranged spaced apart from one another and are connected together by means of the transverse frame element. Preferably, the transverse frame element is oriented perpendicularly to the axial direction. Preferably, the longitudinal frame elements are operatively connected in each case to the guide device with guiding movement, preferably by means of corresponding guide elements. Preferably, the at least one transverse frame element serves for supporting the cover element and/or for introducing the force of the drive rod element into the bearing device.

In a further embodiment of the invention, the bearing frame and the cover element are configured as a component joined as a single piece and preferably produced from plastics. As a result, an even more simplified design may be achieved. In particular, a separate joint between the cover element and the bearing frame may be dispensed with.

In a further embodiment of the invention, the drive rod element is a toothed rod which meshes with a drive gear of the drive device, wherein the drive gear, in the ready-for-use mounted state, is rotatably mounted about a rotational axis in a manner fixed to the vehicle and is driven by means of a drive motor. This embodiment is particularly robust. Additionally, by structurally simple means a transmission may be provided between a drive speed of the drive motor and a drive speed of the toothed rod, and thus of the cover element, and adapted to specific requirements associated with the respective motor vehicle.

The object of the invention is also achieved in that the drive device has a drive gear which—in the ready-for-use mounted state—is rotatably mounted in a manner fixed to the vehicle, and has a toothed rod element which meshes with the drive gear and which is connected to the cover element in an immovable manner relative to the cover element and is guided together therewith with reciprocating and longitudinal movement, wherein the toothed rod element has a first toothed portion which is longitudinally extended in the reciprocating direction and which cooperates with the drive gear during the reciprocating movement, and a second toothed portion which is longitudinally extended in the longitudinal direction and which cooperates with the drive gear during the longitudinal movement. By means of this solution, a particularly simple and particularly robust design of the closure arrangement is achieved. To this end, the drive device has the drive gear and the toothed rod element meshed therewith. The drive gear and the toothed rod element form a toothed rod drive for the displacement of the cover element. This toothed rod drive drives both the reciprocating and the longitudinal movement of the cover element during the displacement between the closed and the open position. In order to permit this, said toothed rod drive has a design and/or arrangement according to the invention. In this case the toothed rod element is attached rigidly in terms of movement to the cover element. In other words, no relative movement takes place between the cover element and the toothed rod element during the displacement between the closed and open position. Rather, the cover element and the toothed rod element are guided together and on the guide device with reciprocating and longitudinal movement. In order to ensure a reciprocating and longitudinal movement which fulfils requirements, the toothed rod element has toothed portions which are oriented differently regarding their respective longitudinal extent. In simple terms, these toothed portions which are longitudinally extended in different ways ensure that the toothed rod element always remains in interlocking engagement with the drive gear during said reciprocating and longitudinal movement. Accordingly, the toothed rod element is not simply provided in the conventional manner with a toothing which is longitudinally extended in the axial direction of the toothed rod element. Rather, the toothing of the toothed rod element is oriented in some sections differently relative to the axial direction. In the first toothed portion, the toothing is longitudinally extended in, preferably parallel to, the reciprocating direction of the displacement movement. In the second toothed portion, the toothing is longitudinally extended in, preferably parallel to, the longitudinal direction of the displacement movement. Relative to the axial direction of the toothed rod element, the toothing preferably runs in the first toothed portion in a manner which is oblique or bent and in the second toothed portion in a manner which is preferably parallel. Depending on the displacement position of the cover element, the drive gear drives the toothed rod element either in the first toothed portion or in the second toothed portion. In this case, the toothed rod element moves together with the cover element relative to the drive gear which, in the ready-for-use mounted state, is fixed to the vehicle. The drive gear is preferably driven rotatably by means of a drive motor of the drive device about a rotational axis fixed to the vehicle. The toothed rod element is preferably arranged on a lower face of the cover element facing the fuel inlet compartment. In an embodiment of the invention, a further toothed rod element is provided for driving the cover element and is preferably arranged in the transverse direction of the cover element spaced apart from the toothed rod element and longitudinally extended parallel thereto.

In a further embodiment of the invention, the toothed rod element has a third toothed portion which forms a longitudinally curved transition between the first toothed portion and the second toothed portion. The longitudinally curved transition permits a continuous change in the direction of movement between the reciprocating direction and the longitudinal direction. As a result, the cover element may be displaced between the closed and the open position without an abrupt transition between the reciprocating and longitudinal movement. The third toothed portion leads at one end into the first toothed portion and at the other end into the second toothed portion. The third toothed portion cooperates with the drive gear during a change of direction of the displacement movement of the cover element between the reciprocating movement and the longitudinal movement.

In a further embodiment of the invention, the cover element and the toothed rod element are arranged on a bearing device which cooperates with the guide device with sliding and/or rolling movement. The bearing device serves for a bearing of the cover element and of the toothed rod element on the guide device with guided movement. At the same time, the bearing device produces an operative connection transmitting drive force between the cover element and the toothed rod element. Relative to the bearing device, the cover element and the toothed rod element are immovably connected thereto. Preferably, the cover element is arranged on an upper face of the bearing device. The toothed rod element is preferably arranged on a lower face of the bearing device opposing the upper face.

In a further embodiment of the invention, the bearing device has a plurality of guide elements which protrude laterally from the toothed rod element and which are supported on one respective guide track of the guide device with sliding movement. As a result, a particularly compact construction may be achieved. The guide elements are preferably configured in each case as a sliding element. The guide tracks are preferably designed in each case as a sliding track in the form of a sliding web or sliding slot. For the guidance of the cover element with reciprocating and longitudinal movement the guide tracks have differently oriented portions which are longitudinally extended in the reciprocating and/or longitudinal direction. In this case, the longitudinal extent of the different toothed portions of the toothed rod element is preferably adapted to the respective longitudinal extent of the different portions of the guide tracks and/or is parallel thereto.

In a further embodiment of the invention, the bearing device is designed in the form of a bearing frame which has two longitudinal frame elements which are longitudinally extended in an axial direction of the toothed rod element and which are connected together by means of at least one transverse frame element which is longitudinally extended transversely to the axial direction, wherein the toothed rod element is configured on one of the longitudinal frame elements. This embodiment permits a structurally simple and particularly robust design. Preferably, the longitudinal frame elements are longitudinally extended parallel to the axial direction of the toothed rod element. The toothed rod element is configured on one of the longitudinal frame elements. In other words, one of the longitudinal frame elements has toothings which are longitudinally extended in different ways and which form the different toothed portions of the toothed rod element. Preferably, the longitudinal frame elements cooperate with the guide device, preferably by means of corresponding guide elements, with sliding and/or rolling movement. The longitudinal frame elements are arranged spaced apart from one another perpendicularly to the axial direction of the toothed rod element. In this case, the transverse frame element functions, in particular, as a connecting element between the longitudinal frame elements. Further, preferably, the cover element is supported on the transverse frame element. To this end, the transverse frame element may have a fastening portion for fastening the cover element.

In a further embodiment of the invention, the cover element has a flange portion which is arranged on the lower face and which is screwed to a mating flange portion arranged on the upper face on the bearing device, wherein an adjusting element is provided, said adjusting element being arranged between the flange portion and the mating flange portion and being deformable in a rubber-elastic manner for adjusting a relative alignment of the cover element relative to the bearing device by means of the screw connection. The adjusting element is deformable in a variable manner between the flange portion and the mating flange portion, depending on the tightening torque of the screw connection, so that the spacing thereof changes according to the deformation state of the adjusting element. With this change to the spacing, the alignment of the cover element also forcibly changes relative to the bearing device. Finally, by means of this embodiment of the invention, the cover element may be oriented in a simple manner flush with the surface of the body of the motor vehicle.

Further advantages and features of the invention are disclosed in the claims and in the following description of preferred exemplary embodiments of the invention which are shown with reference to the drawings.

DETAILED DESCRIPTION

Figure 1:
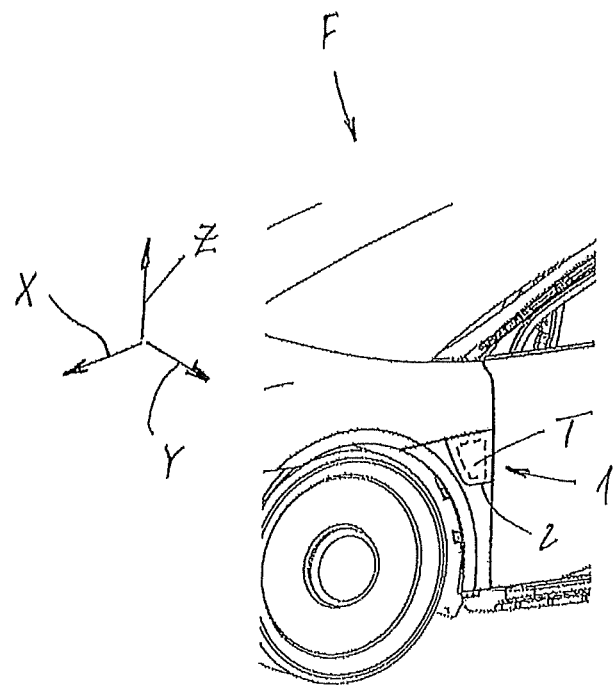
FIG. 1 shows in a cut-away perspective view an electrically driven motor vehicle with an embodiment of a closure arrangement according to the invention which is provided for closing a charging socket compartment of the body of the motor vehicle.

According to FIG. 1 a motor vehicle F is provided with a closure arrangement 1. The closure arrangement 1 serves as an openable closure of a fuel inlet compartment T which in the exemplary embodiment shown is arranged in a left-hand, front-side region of the body K of the motor vehicle F.

In the present case, the motor vehicle F is an electrically driven passenger motor vehicle. The fuel inlet compartment T thus may also be denoted as the charging socket compartment. In a manner known in principle, an electrical charging socket L (FIGS. 3, 4) is arranged in the region of the fuel inlet compartment and/or charging socket compartment T. This electrical charging socket is provided for the electrical charging of a traction battery of the electrically driven passenger motor vehicle.

Figure 2:
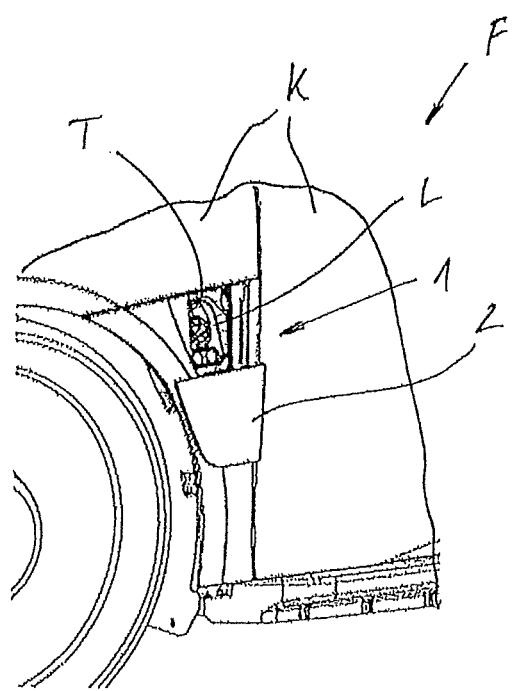
FIG. 2 shows in enlarged detailed view the region of the charging socket compartment according to FIG. 1, wherein a cover element of the closure arrangement adopts an open position.
Figure 3:
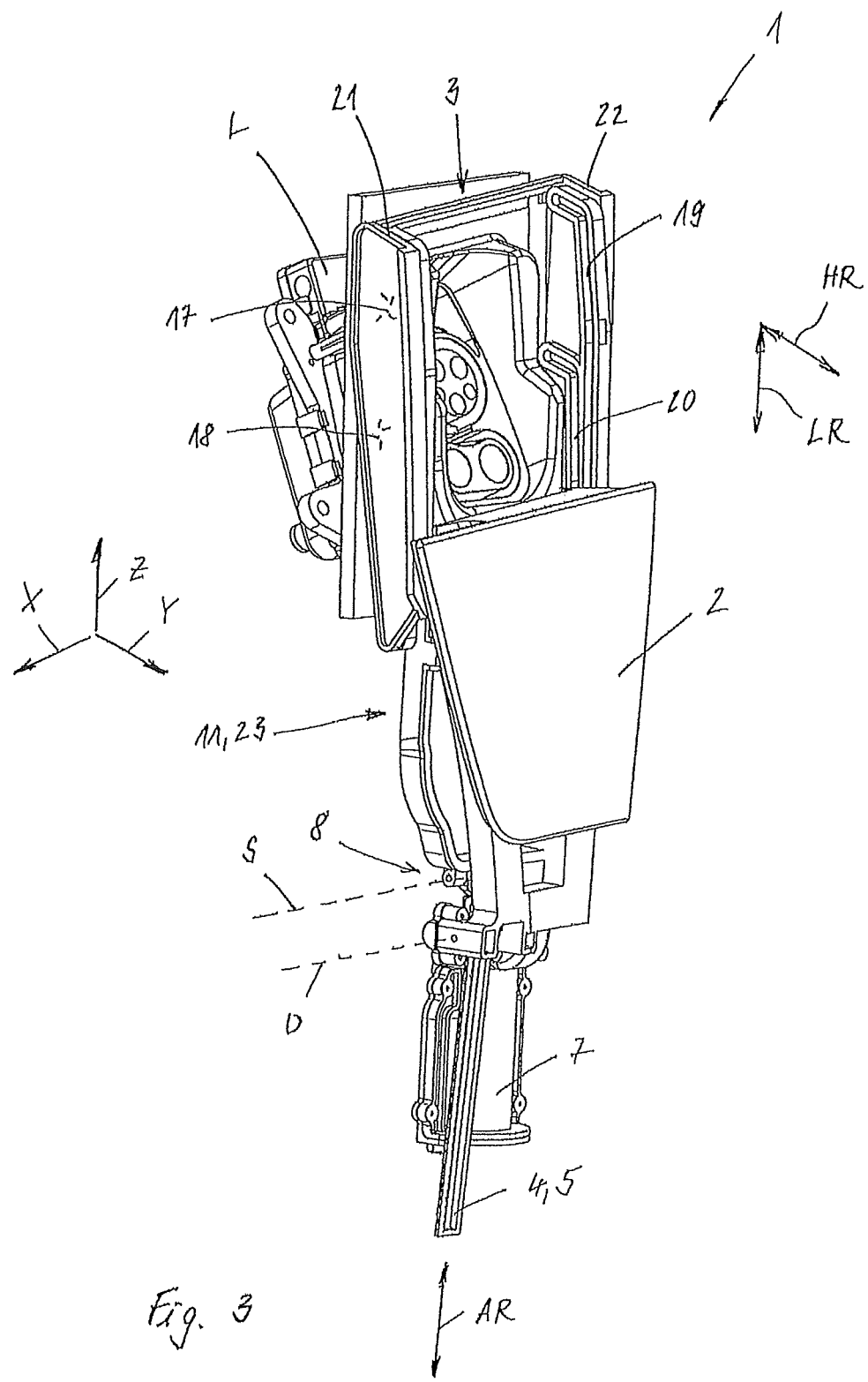
FIG. 3 shows in a schematic perspective view the closure arrangement according to FIGS. 1 and 2 together with a charging socket assigned to the charging socket compartment.
Figure 4:
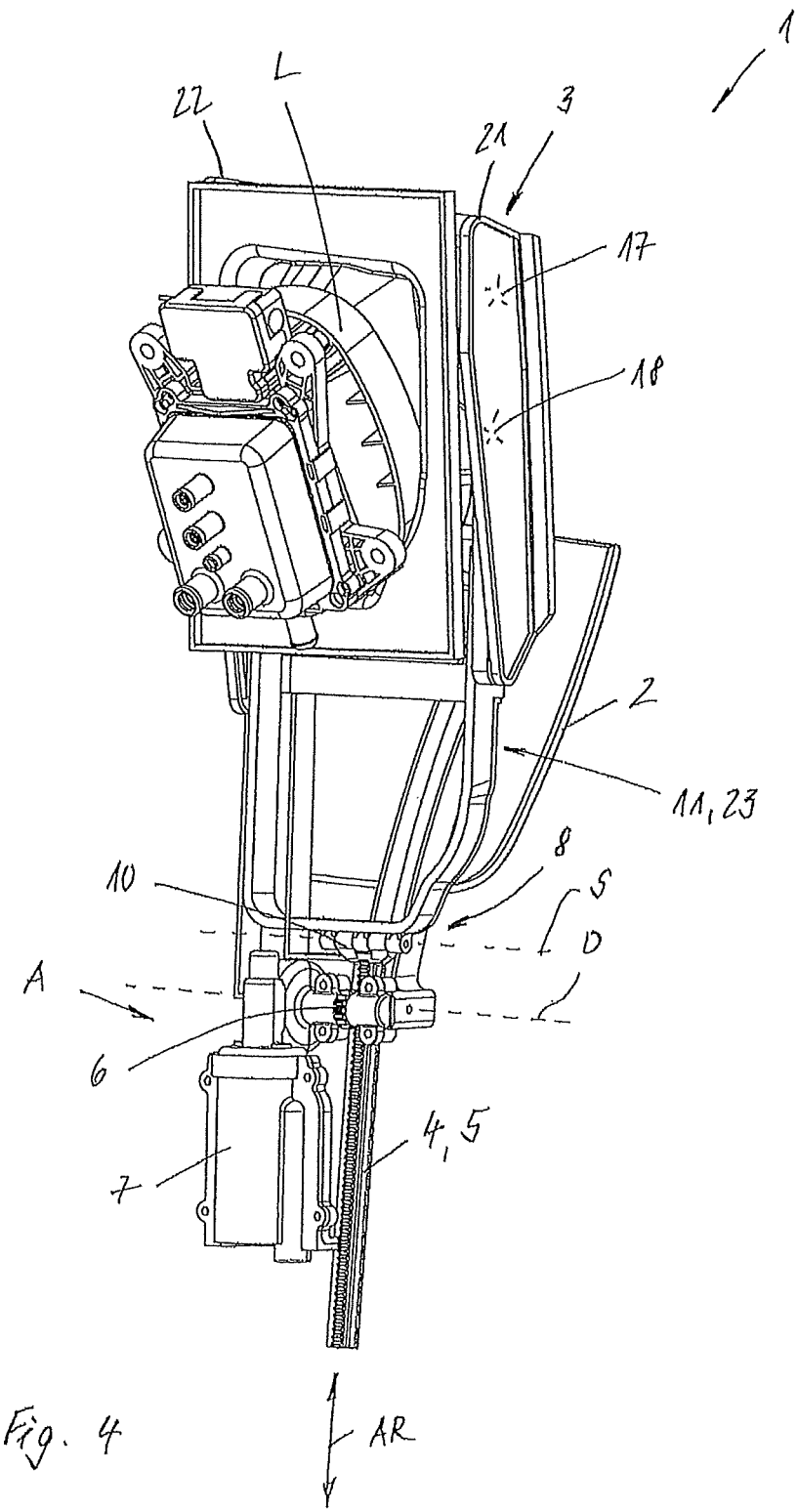
FIG. 4 shows the closure arrangement according to FIGS. 1 to 3 together with the charging socket in a further schematic perspective view.

The closure arrangement 1 has a cover element 2 which may also be denoted as a filler cap or charging socket cap. The cover element 2 is displaceably guided between a closed position (FIGS. 1, 5) and an open position (FIGS. 2, 3, 4). For guiding the displacement movement of the cover element 2 between the closed position and the open position the closure arrangement 1 has a guide device 3. This guide device 3 is arranged fixed to the vehicle in the ready-for-use mounted state, shown with reference to FIGS. 1 and 2, and to this end, in a manner known in principle, joined in the region of the charging socket compartment T to portions of the body K provided therefor. In the closed position, the cover element 2 closes the charging socket compartment T. In this case, the cover element 2 is oriented flush with the surface of the body portions of the body K surrounding the charging socket compartment T. In the open position, the cover element 2 opens up the charging socket compartment T. As a result, the charging socket L is freely accessible. Accordingly, in the open position a charging cable with a corresponding charging plug may be attached to the charging socket L.

The displacement of the cover element 2 which is guided on the guide device 3 between the closed and open position comprises a reciprocating movement in a reciprocating direction HR and a longitudinal movement in a longitudinal direction LR. The reciprocating direction HR and the longitudinal direction LR are oriented perpendicularly to one another. In the embodiment shown, the reciprocating direction HR is parallel to a vehicle transverse direction Y. The longitudinal direction LR is parallel to a vehicle vertical direction Z. In this case, the cover element 2, starting from the closed position (FIGS. 1, 5), is displaced outwardly in the reciprocating direction HR with reciprocating movement and downwardly in the longitudinal direction LR with longitudinal movement. In other words, in the open position the cover element 2 is displaced outwardly in the vehicle transverse direction Y and downwardly in the vehicle vertical direction Z.

Depending on the local attachment of the charging socket compartment to the motor vehicle and/or the design of the guide device fixed to the vehicle, the reciprocating direction of the reciprocating movement of the cover element and the longitudinal direction of the longitudinal movement of the cover element may be oriented differently relative to the vehicle axes. For example, it is also possible for the cover element to be movable in a vehicle longitudinal direction X during a displacement between the closed and open position.

For the driven displacement of the cover element 2 the closure arrangement 1 has a drive device A which is operatively connected to the cover element 2. The drive device A has a drive rod element 4. The drive rod element 4 is operatively connected in the axial direction AR thereof so as to transmit a pulling and pushing force to the cover element 2. To this end, the drive rod element 4 acts at least indirectly on the cover element 2. The cover element 2 is movable with reciprocating and longitudinal movement between the closed and open position by means of an axial drive movement of the drive rod element 4.

In the embodiment shown, the drive rod element 4 is a toothed rod 5 which meshes with a drive gear 6 of the drive device A. The drive gear 6 is rotatably mounted about a rotational axis D and operatively connected in a torque-proof manner to a drive motor 7 of the drive device A. The drive motor 7 is connected to an electrical on-board network of the motor vehicle F for the supply of operating power, in a manner known in principle but not shown in more detail.

In an embodiment, not shown illustratively, the drive rod element 4 is configured in the form of a threaded rod. The threaded rod is screwed with threading movement to a rotatably mounted and motor-driven threaded nut of the drive device.

In the embodiment shown, the axial direction AR of the drive rod element 4, in a viewing direction oriented parallel to the reciprocating direction HR, is oriented parallel to the longitudinal direction LR. In other words, the drive rod element 4 in the embodiment shown is oriented approximately in the vehicle vertical direction Z. In a viewing direction oriented perpendicularly to the reciprocating direction HR and perpendicularly to the longitudinal direction LR, the axial direction AR of the drive rod element 4 is oriented approximately perpendicularly to the reciprocating direction HR.

Figure 5:
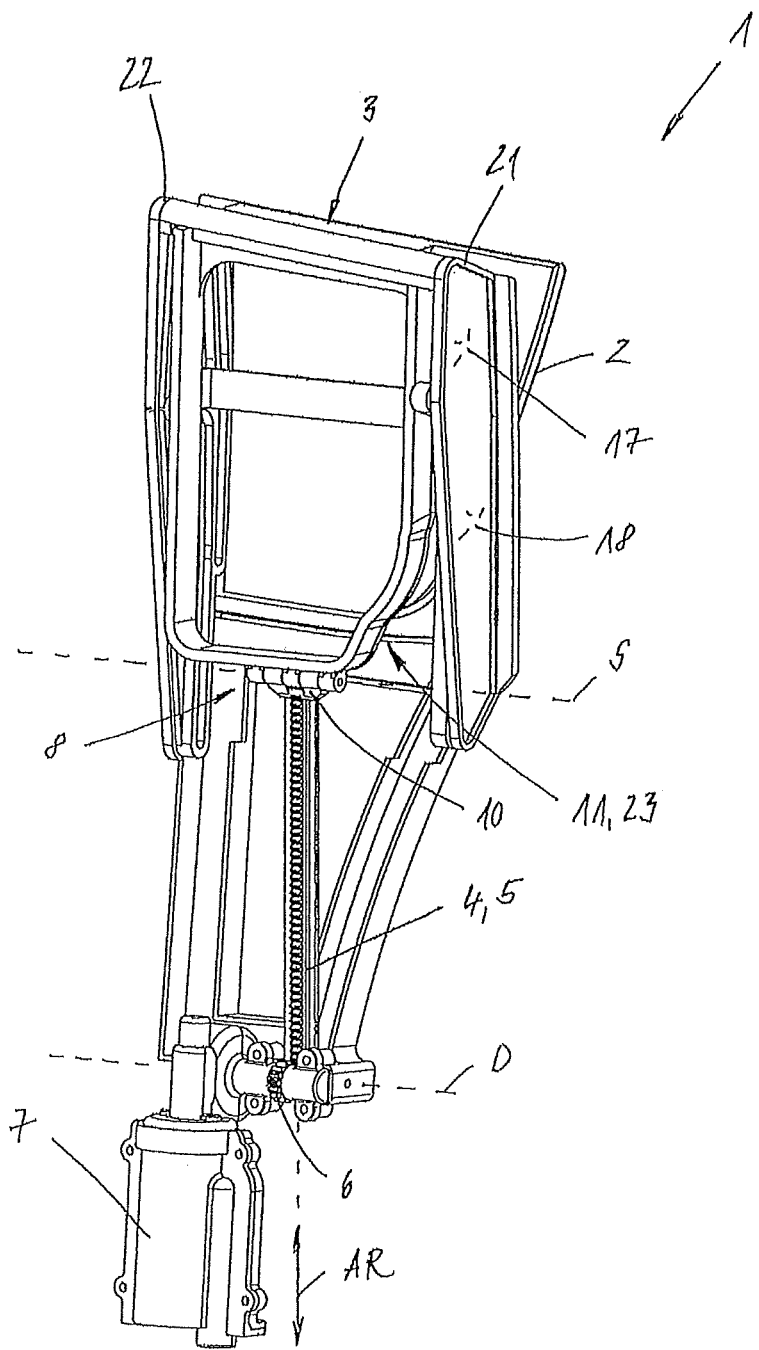
FIG. 5 shows the closure arrangement according to FIGS. 1 to 4 in a view corresponding to FIG. 4, wherein the cover element adopts a closed position.

The principal mode of operation of the closure arrangement 1 when opening and closing the cover element 2 is as follows:

For opening the cover element 2 the drive gear 6 is rotated by means of the drive motor 7 clockwise about the rotational axis D—relative to the drawing plane of FIG. 5. The toothed rod 5 which meshes with the drive gear 6 is moved thereby by the application of a pulling force in the axial direction AR thereof downwardly past the drive gear 6. The cover element 2, which is operatively connected to the toothed rod 5 in a manner to be described in more detail, is driven so as to be displaced in the direction of the open position by the application of a pulling force initially in the reciprocating direction HR with reciprocating movement and then in the longitudinal direction LR with longitudinal movement. In this case, the cover element 2 is guided, in a manner to be described in more detail, with reciprocating and longitudinal movement on the guide device 3 fixed to the vehicle. For the displacement of the cover element 2 into the closed position the drive gear 6 is rotated about the rotational axis D in the opposing direction by means of the drive motor 7. As a result, the toothed rod 5 which meshes with the drive gear 6 is moved by the application of a pushing force in the axial direction AR thereof upwardly past the drive gear 6. The cover element 2, starting from the open position, is displaced thereby initially upwardly with linear movement in the longitudinal direction LR and then inwardly with reciprocating movement in the reciprocating direction HR.

In the embodiment shown, the drive rod element 4 is operatively connected to the cover element 2 by means of an articulated arrangement 8 about a pivot axis S oriented perpendicularly to the axial direction AR, with pivoting movement relative to the cover element 2. The pivotably movable arrangement ensures, in particular, an angular compensation between the axial direction AR and the displacement direction of the cover element 2 which changes during the reciprocating and longitudinal movement. In the embodiment shown, the pivot axis S is oriented parallel to the rotational axis D.

Figure 6:
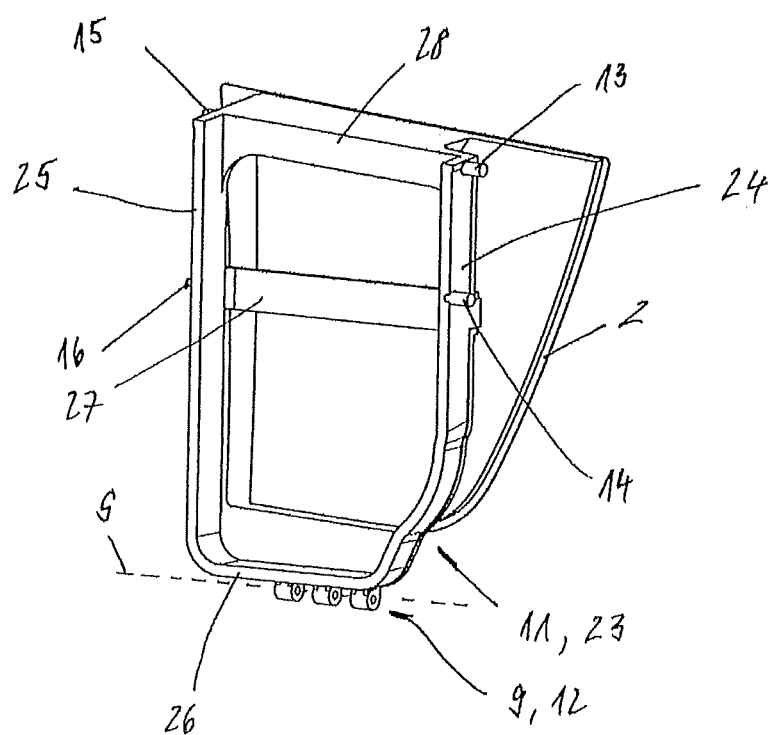
FIG. 6 shows the cover element together with a bearing frame in a perspective view corresponding to FIG. 5.

The articulated arrangement 8 has a second articulated portion 10 which is arranged on the front end side on the drive rod element 4, and a first articulated portion 9 which is operatively connected fixedly to the cover element 2, in a manner to be described in more detail (FIG. 6). The first articulated portion 9 and the second articulated portion 10 form a hinged joint 9, 10 which is movable about the pivot axis S.

The closure arrangement 1 additionally has a bearing device 11 (FIG. 6). The cover element 2 is mounted with guided movement on the guide device 3 by means of the bearing device 11. To this end, the bearing device 11 is supported, in a manner to be described in more detail, with sliding and/or rolling movement on the guide device 3. Relative to the bearing device 11 the cover element 2 is joined thereto in an immovable manner. The drive rod element 4 acts on the bearing device 11 in order to transmit a drive force to the cover element 2. In this case said articulated arrangement 8 is configured between the drive rod element 4 and the bearing device 11. In other words, the first articulated portion 9 is assigned to the bearing device 11 and to this end is configured on a front end region 12 of the bearing device 11 facing the drive rod element 4.

As is visible further in particular with reference to FIG. 6, the bearing device 11 has a plurality of guide elements 13, 14, 15, 16. The guide elements 13 to 16 are extended parallel to the pivot axis S and protrude in pairs laterally from the bearing device 11. The guide elements 13 to 16 may also be denoted as the first guide element 13, the second guide element 14, the third guide element 15 and the fourth guide element 16. The guide elements 13 to 16 are supported on one respective guide track 17 to 20 of the guide device 3 with sliding movement. The guide tracks 17 to 20 have in each case a reciprocating portion, not denoted further, and a longitudinal portion, not denoted further. The reciprocating portions are longitudinally extended in each case in the reciprocating direction HR and serve for guidance with reciprocating movement. The longitudinal portions are longitudinally extended in each case in the longitudinal direction LR and serve for guidance with longitudinal movement. The guide tracks 17 to 20 are configured on opposing side walls 21, 22 of the guide device 3. The guide tracks 17 to 20 may also be denoted as the first guide track 17, the second guide track 18, the third guide track 18 and the fourth guide track 20. The first guide element 13 is supported on the first guide track 17 with sliding movement. The second guide element 14 is supported on the second guide track 18 with sliding movement. The third guide element 15 is supported on the third guide track 19 with sliding movement. The fourth guide element 16 is supported on the fourth guide track 20 with sliding movement.

In the embodiment shown, the guide elements 13 to 16 are designed in each case as sliding elements in the form of a slide pin. The guide tracks 17 to 20 are accordingly designed in each case as a sliding track in the form of a sliding slot in which the corresponding slide pin engages in the axial direction thereof and is held in the radial direction.

The bearing device 11 in the embodiment shown is designed in the form of a bearing frame 23. The bearing frame 23 has two longitudinal frame elements 24, 25 which are spaced apart from one another in the transverse direction. The longitudinal frame elements 24, 25, in a viewing direction oriented parallel to the reciprocating direction HR, are longitudinally extended in any case in the region of the guide elements 13 to 16 parallel to the axial direction AR. The longitudinal frame elements 24, 25 in the embodiment shown are connected together by means of three transverse frame elements 26, 27, 28. The transverse frame elements 26, 27, 28 are oriented substantially in the transverse direction and longitudinally extended between the longitudinal frame elements 24, 25. The transverse frame element 26 may also be denoted as the first transverse frame element and is provided with the first articulated portion 9 of the articulated arrangement 8. The transverse frame element 27 may also be denoted as the second transverse frame element and functions primarily as a reinforcing element. The transverse frame element 28 may also be denoted as the third transverse frame element and forms a connecting element for attaching the cover element 2 to the bearing frame 23.

In the embodiment shown, the bearing frame 23 and the cover element 2 are produced from plastics as a component 2, 23 joined as a single piece. The guide elements 13 to 16 and the first articulated portion 9 form in each case a portion of the component 2, 23 joined as a single piece.

Figure 7:
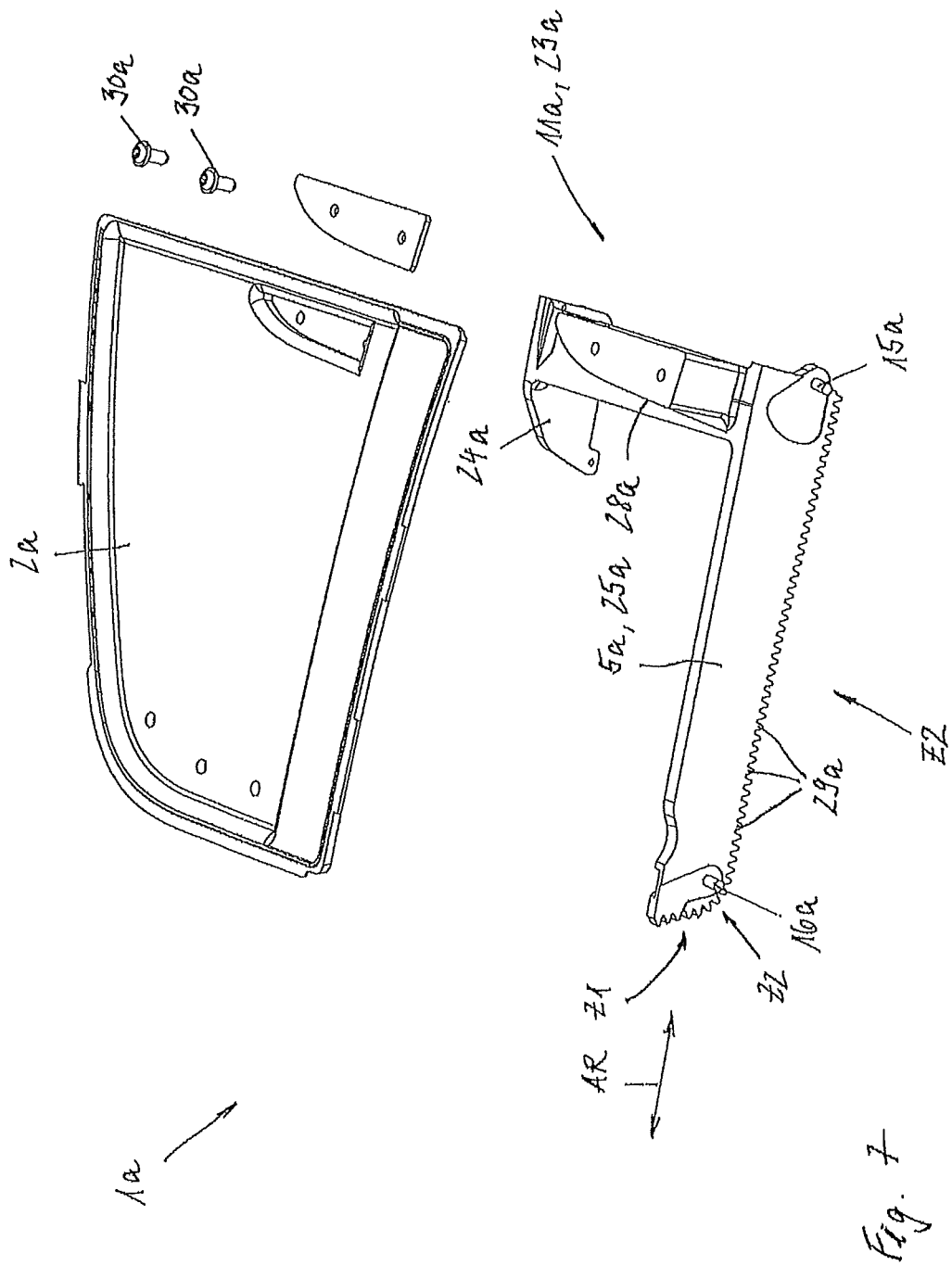
FIG. 7 shows in a perspective exploded view a further embodiment of a closure arrangement according to the invention with individual components and/or portions omitted for illustrative reasons, wherein a cover element, a bearing device and a toothed rod element of the closure arrangement are shown.
Figure 8:
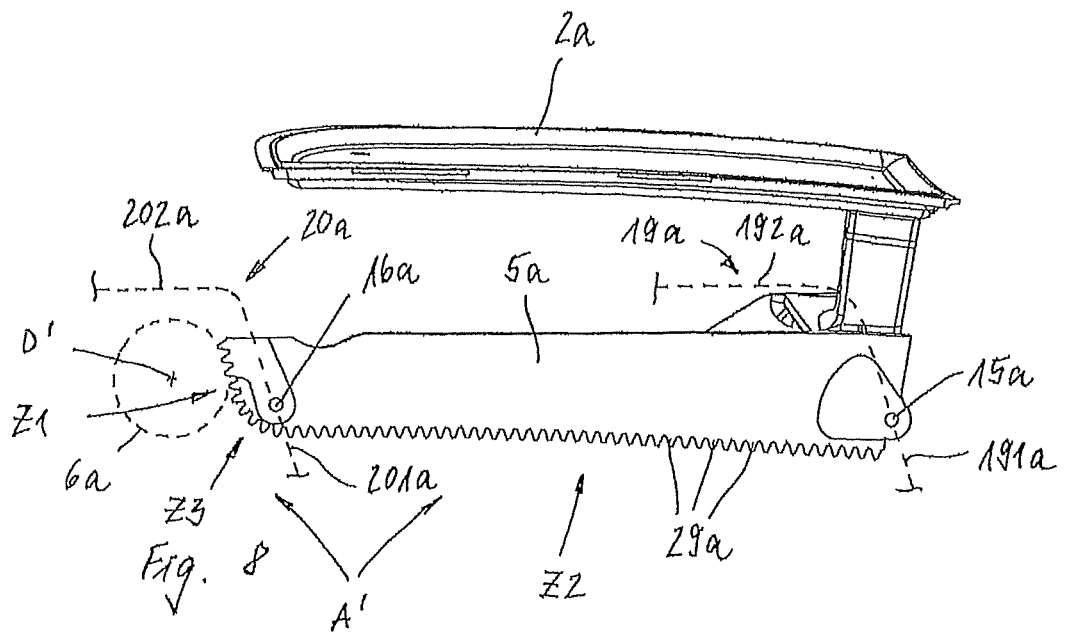
FIG. 8 shows the components, visible with reference to FIG. 7, of the closure arrangement in a lateral viewing direction.
Figure 9:
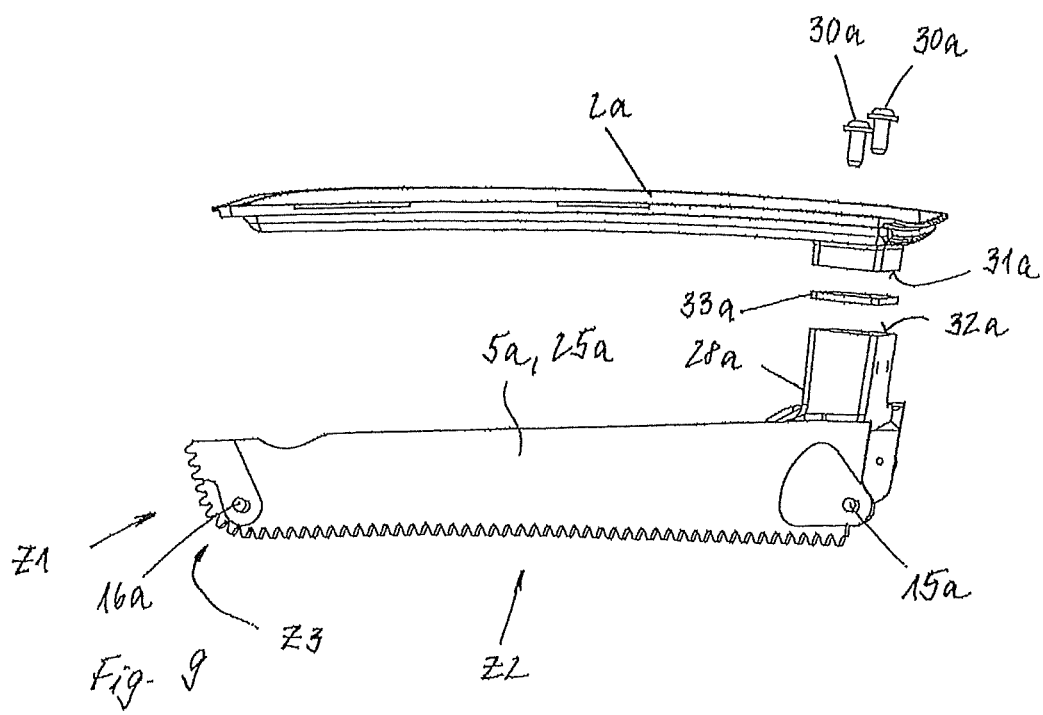
FIG. 9 shows the components, visible with reference to FIGS. 7 and 8, in an exploded view in a lateral viewing direction.

With reference to FIGS. 7 to 9 a further embodiment of a closure arrangement according to the invention 1a is shown, wherein individual components and/or portions are omitted for illustrative reasons. The closure arrangement 1a according to FIGS. 7 to 9 is in some cases identical regarding its design and its mode of operation to the closure arrangement 1 according to FIGS. 1 to 6. This applies, in particular, to the embodiment of the guide device, which for this reason is not shown in detail in the closure arrangement 1a. The closure arrangement 1a differs substantially from the closure arrangement 1 according to FIGS. 1 to 6 by the embodiment of its drive device A'.

The drive device A' has a drive gear 6a which is mounted fixedly on the vehicle, in the ready-for-use mounted state, about a rotational axis D'. The drive gear 6a is shown merely schematically with reference to FIG. 8 and is represented by a dashed line. The drive gear 6a, in a manner comparable with the drive gear 6, is operatively connected in a torque-proof manner to a drive motor of the closure arrangement 1a, not shown, and rotatable thereby about the rotational axis D'. The drive device A' additionally has a toothed rod element 5a which meshes with the drive gear 6a. In contrast to the toothed rod 5 of the closure arrangement 1, relative to the cover element 2a the toothed rod element 5a is immovably connected thereto and together therewith guided with reciprocating and longitudinal movement on the guide device of the closure arrangement 1a. The guide device of the closure arrangement 1a, in a manner corresponding to the guide device 3, permits a displacement movement of the cover element 2a with reciprocating and longitudinal movement between a corresponding open and closed position. To this end, the guide device of the closure arrangement 1a has a plurality of guide tracks, only two guide tracks 19a, 20a thereof being indicated schematically with reference to FIG. 8.

The toothed rod element 5a has a first toothed portion Z1 and a second toothed portion Z2. The toothed portions Z1, Z2 are longitudinally extended in different directions and are angled relative to one another in this regard. The first toothed portion Z1 cooperates with the drive gear 6a during the reciprocating movement of the cover element 2a. The second toothed portion Z2 cooperates with the drive gear 6a during the longitudinal movement of the cover element 2a. The first toothed portion Z1 is longitudinally extended in the reciprocating direction, and the second toothed portion Z2 is longitudinally extended in the longitudinal direction, of the displacement movement of the cover element 2a. In other words, a toothing of the toothed rod element 5a formed by teeth 29a is longitudinally extended in different ways in some portions.

The toothed rod element 5a additionally has a third toothed portion Z3. This third toothed portion forms a longitudinally curved transition between the first toothed portion Z1 and the second toothed portion Z2. In this case, the toothing of the toothed rod element 5a is configured in the same shape, independently of the respective toothed portion Z1, Z2, Z3, i.e. configured with an identical shape of the respective teeth 29a. The only difference is the orientation thereof relative to the axial direction AR of the toothed rod element 5a. The toothed portions Z1 and Z2 have in each case a uniform toothing direction, not denoted further. However, a toothing direction of the third toothed portion 23 is changeable and configured at one end of the third toothed portion Z3 identically with the toothing direction of the first toothed portion Z1 and at the other end identically with the toothing direction of the second toothed portion Z2.

In the embodiment shown, the cover element 2a and the toothed rod element 5a are arranged on a bearing device 11a. The bearing device 11a is guided on the guide device of the closure arrangement 1a with sliding movement. This is carried out in an identical manner to the bearing device 11 of the closure arrangement 1, or in any case in a very similar manner. Both the cover element 2a and the toothed rod element 5a are immovable relative to the bearing device 11a during the displacement movement. For guiding the displacement movement the bearing device 11a has a plurality of guide elements 15a, 16a protruding laterally from the toothed rod element 5a. The guide elements 15a, 16a are supported in each case on a guide track 19a and/or 20a of the guide device with sliding movement. The guide tracks 19a, 20a are shown in simplified form merely schematically with reference to FIG. 8. The guide element 15a may also be denoted as the first guide element. The guide element 16a may also be denoted as the second guide element. The same applies to the guide tracks 19a, 20a. The first guide track 19a has a reciprocating portion 191a and a longitudinal portion 192a. The same applies to the second guide track 20a which accordingly has a reciprocating portion 201a and a longitudinal portion 202a.

The guide elements 15a, 16a are designed in each case as a sliding element in the form of a slide pin. Accordingly, the guide tracks 19a, 20a are designed in each case as a sliding track in the form of a sliding slot. This corresponds to the embodiment according to FIGS. 1 to 6. It goes without saying that the bearing device 11a has further guide elements, not shown in more detail, which are arranged spaced apart from the guide elements 15a, 16a in the transverse direction and cooperate with corresponding guide tracks of the guide device with sliding movement. In this regard, the guidance of the bearing device 11a is carried out in principle according to the guidance of the bearing device 11.

The bearing device 11a is configured in the form of a bearing frame 23a. This bearing frame has two longitudinal frame elements 24a, 25a which are longitudinally extended in the axial direction AR of the toothed rod element 5a. The longitudinal frame elements 24a, 25a are connected together by means of a transverse frame element 28a which is transversely extended to the axial direction AR. The toothed rod element 5a forms the longitudinal frame element 25a. The longitudinal frame element 24a, which may also be denoted as the first longitudinal frame element in the embodiment shown, is significantly shorter than the toothed rod element 5a. Said further guide elements are arranged on the first longitudinal frame element 24a and protrude outwardly in a manner corresponding to the guide elements 15a, 16a in the lateral direction. The cover element 2a is supported on the transverse frame element 28a and is connected thereto. To this end, the cover element 2a is screwed by means of a screw connection, in the present case comprising two screws 30a, to the transverse frame element 28a.

The cover element 2a has a flange portion 31a which is arranged on the lower face and which is oriented downwardly in the direction of the toothed rod element 5a. The transverse frame element 28a has a mating flange portion 32a which is arranged on the upper face and which is oriented upwardly in the direction of the cover element 2a. An adjusting element 33a is arranged between the flange portion 31a and the mating flange portion 32a. The adjusting element 33a is deformable in a rubber-elastic manner by means of said screw connection and permits an adjustment of the alignment of the cover element 2a relative to the bearing device 11a. To this end, in the ready-for-use mounted state, the cover element 2a may be aligned flush relative to the surface of the body portions of the body K surrounding the charging compartment T. The adjusting element 33a is designed in a complementary manner to a shape of the portions 31a, 32a and is produced from a rubber-elastic material.

The mode of operation of the closing arrangement 1a during the displacement movement of the cover element 2a from the closed into the open position is as follows:

In the closed position the guide elements 15a, 16a are located inside the respective reciprocating portion 191a, 201a of the respective guide track 19a and/or 20a. The drive gear 6a cooperates in the region of the first toothed portion Z1 with the toothed rod element 5a. For the displacement in the direction of the open position the drive gear 6a, relative to the drawing plane of FIG. 8, is rotated so as to be driven counterclockwise about the rotational axis D'. As a result, the toothed rod element 5a, together with the bearing device 11a and the cover element 2a located thereon, is displaced with reciprocating movement in the reciprocating direction. The guide elements 15a, 16a now move in the respective reciprocating portion 191a, 201a of the respective guide track 19a and/or 20a in a slidably guided manner. The guide tracks 19a, 20a are curved in some portions in a transition between the respective reciprocating portion 191a, 201a and the corresponding longitudinal portion 192a and/or 202a. With a movement of the guide elements 15a, 16a in this curved region, the drive gear 6a engages in the third toothed portion Z3. The curvature thereof opposes the curvature of the guide tracks 19a, 20a. With a further rotational movement of the drive gear 6a, this drive gear engages with the second toothed portion Z2. As a result, the toothed rod element 5a, together with the bearing device 11a and the cover element 2a located thereon, is moved with longitudinal movement and, relative to the drawing plane of FIG. 8, to the left. In this case, the guide elements 15a, 16a are supported on the respective longitudinal portion 192a and/or 202a of the guide tracks 19a, 20a. A displacement movement starting from the open position into the closed position is carried out in a kinematically reversed sequence.

The invention claimed is:

1. A closure arrangement for closing a fuel inlet compartment of a body of a motor vehicle, the closure arrangement comprising:
    a guide device, the guide device, in a mounted and ready-for-use state, being fixed to the vehicle;
    a cover element displaceably guided on the guide device between a closed position, the cover element in the closed position closing the fuel inlet compartment, and an open position, the cover element in the open position allowing access to the fuel inlet compartment, one of the guide device and the cover element having at least one track element and the other of the guide device and the cover element having at least one track-engaging element slidably engaged with the at least one track element, the at least one track element being configured to cause the cover element to undergo both a reciprocating movement in a reciprocating direction and a longitudinal movement in a longitudinal direction during movement between the closed and open positions; and
    a drive device operatively connected to the cover element to drive and displace the cover element between the closed position and the open position, the drive device including a drive rod element having a longitudinal axis, the drive rod element moving in an axial direction and acting on the cover element to transmit a pulling force and a pushing force and displace the cover element in the reciprocating and longitudinal directions while moving between the closed position and the open position, the drive rod element being operatively connected to the cover element by a pivot arrangement, the pivot arrangement permitting relative pivoting movement between the drive rod element and the cover element about a pivot axis oriented transversely to the axial direction of the drive rod element.

2. The closure arrangement according to claim 1, further including a bearing device configured for movement along the guide device, the cover element being mounted on the guide device by the bearing device, and the cover element is connected to the bearing device in an immovable manner relative to the bearing device and the drive rod element acts directly on the bearing device.

3. The closure arrangement according to claim 1, wherein the pivot arrangement has a first hinge element arranged on the bearing device and a second hinge element arranged at one end of the drive rod element, the first and second hinge elements being interconnected to one another for pivoting movement about the pivot axis.

4. The closure arrangement according to claim 2, wherein the at least one track element includes first and second track elements disposed in opposed relation with one another on the guide device, the at least one track-engaging element includes a plurality of track-engaging elements disposed on the bearing device and extending parallel to the pivot axis and perpendicularly to the axial direction of the drive rod element, one of the track-engaging elements being supported for sliding movement on the first track element and another of the track-engaging elements being supported for sliding movement on the second track element.

5. The closure arrangement according to claim 2, wherein the bearing device comprises a bearing frame having at least two longitudinal frame elements and at least one transverse frame element interconnecting the at least two longitudinal frame elements, the at least two longitudinal frame elements extending in the axial direction of the drive rod element and the at least one transverse frame element extending transversely to the axial direction.

6. The closure arrangement according to claim 5, wherein the bearing frame and the cover element are configured as a one-piece integral component.

7. The closure arrangement according to claim 1, wherein the drive device includes a drive gear and a drive motor, and the drive rod element comprises a toothed rod meshing with the drive gear, the drive gear being driven by the drive motor and, in a mounted ready-for-use state, being fixed to the vehicle and mounted for rotation about a rotational axis.

8. A closure arrangement for closing a fuel inlet compartment of a body of a motor vehicle, the closure arrangement comprising:
    a guide device, the guide device, in a mounted and ready-for-use state, being fixed to the vehicle;

a bearing device supported on the guide device for movement along the guide device, the bearing device comprising a bearing frame having first and second longitudinal frame elements and at least one transverse frame element interconnecting the first and second longitudinal frame elements in a spaced-apart manner from one another;

a cover element displaceably guided on the guide device between a closed position, the cover element in the closed position closing the fuel inlet compartment, and an open position, the cover element in the open position allowing access to the fuel inlet compartment, the guide device guiding displacement of the cover element between the closed position and the open position, the cover element undergoing both a reciprocating movement in a reciprocating direction and a longitudinal movement in a longitudinal direction during displacement between the closed position and the open position; and a drive device operatively connected to the cover element to drive and displace the cover element between the closed position and the open position, the drive device including a drive gear, the drive gear in a mounted ready-for-use state being fixed to the vehicle and mounted for rotation thereon, the drive device further including a toothed rod element meshed with the drive gear, the toothed rod element and the cover element being guided together on the guide device so as to undergo the reciprocating and the longitudinal movements, the toothed rod element having a first toothed portion extending longitudinally in the reciprocating direction and cooperating with the drive gear during the reciprocating movement, and a second toothed portion extending longitudinally in the longitudinal direction and cooperating with the drive gear during the longitudinal movement, the toothed rod element being an integral component with the first longitudinal frame element of the bearing device and the cover element being mounted on the second longitudinal frame element of the bearing device, the toothed rod element being immovable with respect to the cover element, the first and second longitudinal frame elements extending along an axial direction of the toothed rod element and the at least one transverse frame element extending transversely to the axial direction.

9. The closure arrangement according to claim 8, wherein the toothed rod element has a third toothed portion forming a curved transition region on the toothed rod element between the first toothed portion and the second toothed portion.

10. The closure arrangement according to claim 8, wherein the guide device includes first and second guide tracks, the toothed rod element has a plurality of guide elements protruding laterally from the toothed rod element, at least one of the guide elements being supported for sliding movement on the first guide track of the guide device and at least another one of the guide elements being supported for sliding movement on the second guide track.

11. A closure arrangement for closing a fuel inlet compartment of a body of a motor vehicle, comprising:
a guide device, the guide device, in a mounted ready-for-use state, being fixed to the vehicle;
a bearing device supported on the guide device for movement along the guide device, the bearing device having a flange portion;
a cover element having a flange portion adjustably fastened to the flange portion of the bearing device, the cover element being displaceably guided on the guide device between a closed position, the cover element in the closed position closing the fuel inlet compartment and an open position, the cover element in the open position allowing access to the fuel inlet compartment, the guide device guiding displacement of the cover element between the closed position and the open position, the cover element undergoing both a reciprocating movement in a reciprocating direction and a longitudinal movement in a longitudinal direction during displacement between the closed position and the open position;
an adjusting element disposed between the flange portion of the bearing device and the flange portion of the cover element, the adjusting element being deformable to permit adjustment of a position of the cover element relative to the bearing device; and
a drive device operatively connected to the cover element to drive and displace the cover element between the closed position and the open position, the drive device including a drive gear, the drive gear in a mounted ready-for-use state being fixed to the vehicle and mounted for rotation thereon, the drive device further including a toothed rod element disposed on the bearing device and meshed with the drive gear and immovably connected to the cover element, the toothed rod element and the cover element being guided together on the guide device so as to undergo the reciprocating and the longitudinal movements, the toothed rod element having a first toothed portion extending longitudinally in the reciprocating direction and cooperating with the drive gear during the reciprocating movement, and a second toothed portion extending longitudinally in the longitudinal direction and cooperating with the drive gear during the longitudinal movement.

12. The closure arrangement according to claim 6, wherein the one-piece integral component comprises plastic.

13. The closure arrangement according to claim 11, wherein the cover element has a lower face and the bearing device has an upper face, the flange portion of the cover element being disposed on the lower face of the cover element and the flange portion of the bearing device being disposed on the upper face of the bearing device, the flange portion of the bearing device being fastened to the flange portion of the cover element by a screw connection, the adjusting element being deformable in an elastic manner by manipulating the screw connection.

14. The closure arrangement according to claim 1, wherein the at least one track element has a reciprocating track portion extending in the reciprocating direction and a longitudinal track portion extending in the longitudinal direction, the reciprocating track portion and the longitudinal track portion being oriented transversely to one another.

15. The closure arrangement according to claim 14, wherein the at least one track element comprises first and second track elements disposed on opposite sides of said one of the guide device and the cover element, and the at least one track-engaging element comprises first and second track-engaging elements disposed on opposite sides of said other of the guide device and the cover element in slidable engagement with the respective first and second track elements.

16. The closure arrangement according to claim 15, wherein the first and second track elements are disposed in opposed and facing relation with one another on the respective said opposite sides of said cover element and said first and second track-engaging elements project outwardly from the respective opposite sides of said cover element and extend substantially parallel to the pivot axis.

17. A closure arrangement for a fuel inlet compartment located in a body of a motor vehicle, said closure arrangement comprising:
- a cover moveable between a closed position and an open position, said cover in the closed position closing off the fuel inlet compartment and in the open position allowing access to the fuel inlet compartment, said cover having a frame;
- a drive device operatively connected to said cover to displace said cover between the closed position and the open position, said drive device comprising a drive rod having a longitudinal axis;
- a pivot arrangement operatively connecting said drive rod to said cover, said pivot arrangement permitting relative pivoting movement between said drive rod and said cover about a pivot axis; and
- a guide device, said guide device in a use state being non-movably fixed to the motor vehicle, said cover being supported on said guide device for movement between the open and closed positions, one of said guide device and said frame of said cover having a guide track arrangement and the other of said guide device and said frame having at least one guide element slidably engaged with said guide track arrangement, said guide track arrangement having a first track portion configured to cause a reciprocating movement of said cover relative to said guide device in a reciprocating direction, and a second track portion configured to cause a longitudinal movement of said cover relative to said guide device in a longitudinal direction, wherein actuation of said drive device moves said drive rod in an axial direction and displaces said cover in both the reciprocating and longitudinal directions while moving between the closed and open positions, the pivot axis of said pivot arrangement being oriented transversely to the axial direction of said drive rod.

* * * * *